US008823983B2

(12) United States Patent  (10) Patent No.: US 8,823,983 B2
Yamada  (45) Date of Patent: Sep. 2, 2014

(54) TERMINAL DEVICE USED TO TRANSMIT IMAGE DATA FOR RAPID PRINTING

(75) Inventor: Ryuji Yamada, Ogaki (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 113 days.

(21) Appl. No.: 13/426,480

(22) Filed: Mar. 21, 2012

(65) Prior Publication Data

US 2013/0050749 A1 Feb. 28, 2013

(30) Foreign Application Priority Data

Aug. 31, 2011 (JP) ................................ 2011-189381

(51) Int. Cl.
*G06K 15/00* (2006.01)
*G06F 3/12* (2006.01)

(52) U.S. Cl.
USPC .......................... 358/1.15; 358/1.14; 358/1.16

(58) Field of Classification Search
CPC ... G06F 3/1204; G06F 3/1212; G06F 3/1244; G06F 3/1284; G06F 3/1296; G06K 15/00; G06K 15/02; G06K 2215/0002; H04N 1/00278; H04N 2201/3288
USPC ............................................... 358/1.14, 1.16
See application file for complete search history.

(56) References Cited

U.S. PATENT DOCUMENTS

| 5,210,823 | A | 5/1993 | Moroi |
| 5,774,638 | A | 6/1998 | Kageyama et al. |
| 6,049,394 | A | 4/2000 | Fukushima |
| 2004/0085564 | A1* | 5/2004 | Peavey et al. ................. 358/1.13 |
| 2005/0088676 | A1* | 4/2005 | Kitada et al. ................. 358/1.11 |
| 2005/0162691 | A1* | 7/2005 | Tsuzuki ....................... 358/1.15 |
| 2007/0153321 | A1 | 7/2007 | Hwang et al. |
| 2008/0259399 | A1* | 10/2008 | Wada ........................... 358/1.15 |
| 2009/0051969 | A1 | 2/2009 | Yoo |
| 2009/0268226 | A1* | 10/2009 | Horii ............................ 358/1.14 |

FOREIGN PATENT DOCUMENTS

| JP | H11-001029 A | 1/1999 |
| JP | 3019515 B2 | 3/2000 |
| JP | 3304081 B2 | 7/2002 |
| JP | 2004-326266 A | 11/2004 |
| JP | 2005-100356 A | 4/2005 |
| JP | 2006-240066 A | 9/2006 |

OTHER PUBLICATIONS

European Patent Office, Extended European Search Report for European Patent Application No. 12160383.1 (counterpart to above-captioned patent application), mailed Sep. 5, 2013.

* cited by examiner

*Primary Examiner* — Fred Guillermety
(74) *Attorney, Agent, or Firm* — Merchant & Gould PC

(57) ABSTRACT

A non-transitory computer-readable medium having a computer program causing a computer mounted in a terminal device connected to a printer to perform operations comprising: a first print data generation process for generating first print data corresponding to a first specific image which is at least a portion of a target image to be printed, the first print data being generated before a specific operation to cause the printer to start printing using the first print data is carried out in an operating unit of the terminal device; a first print data transmission process for transmitting the first print data to the printer before the specific operation is carried out; and an instruction transmission process for, when the specific operation is carried out, transmitting a printing start instruction to cause the printer to start printing using the first print data to the printer.

10 Claims, 10 Drawing Sheets (CASE B) CASE WHERE TARGET DATA FILE IS NEWLY GENERATED

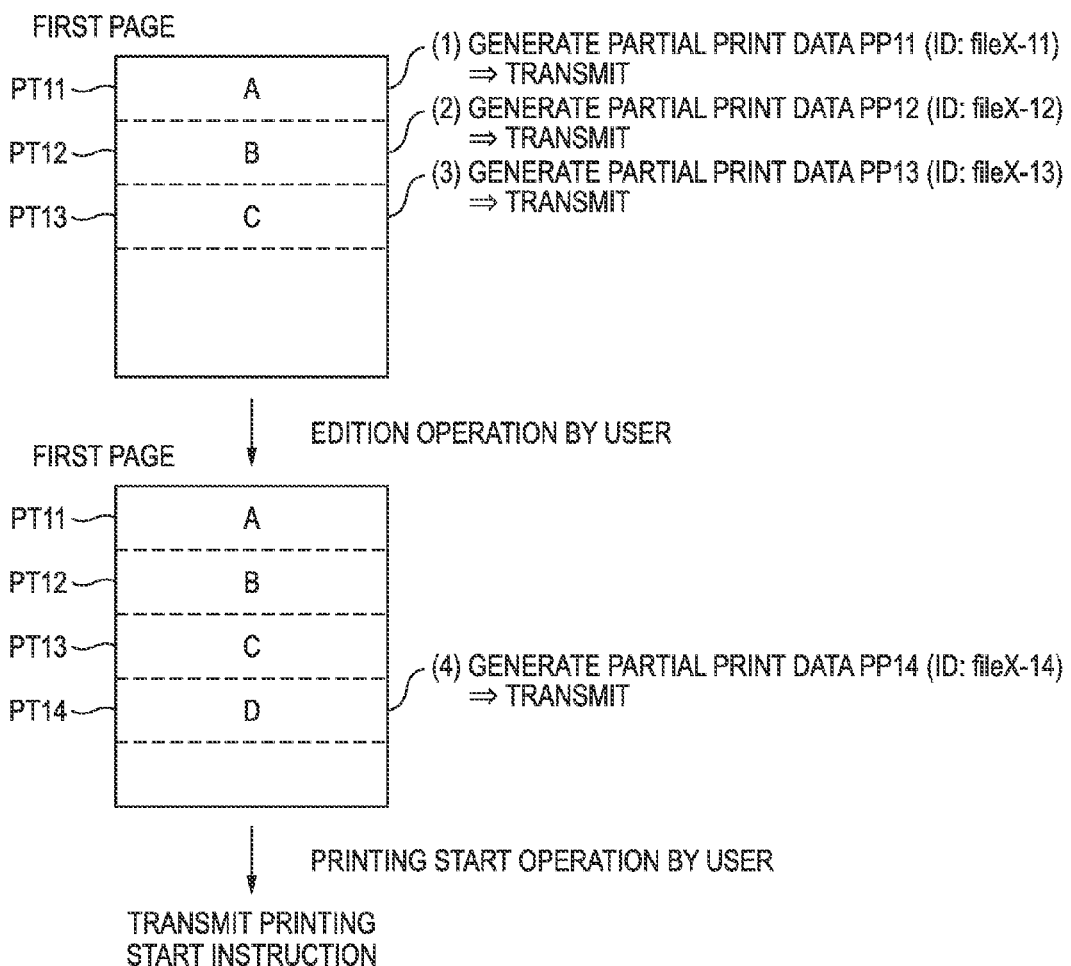

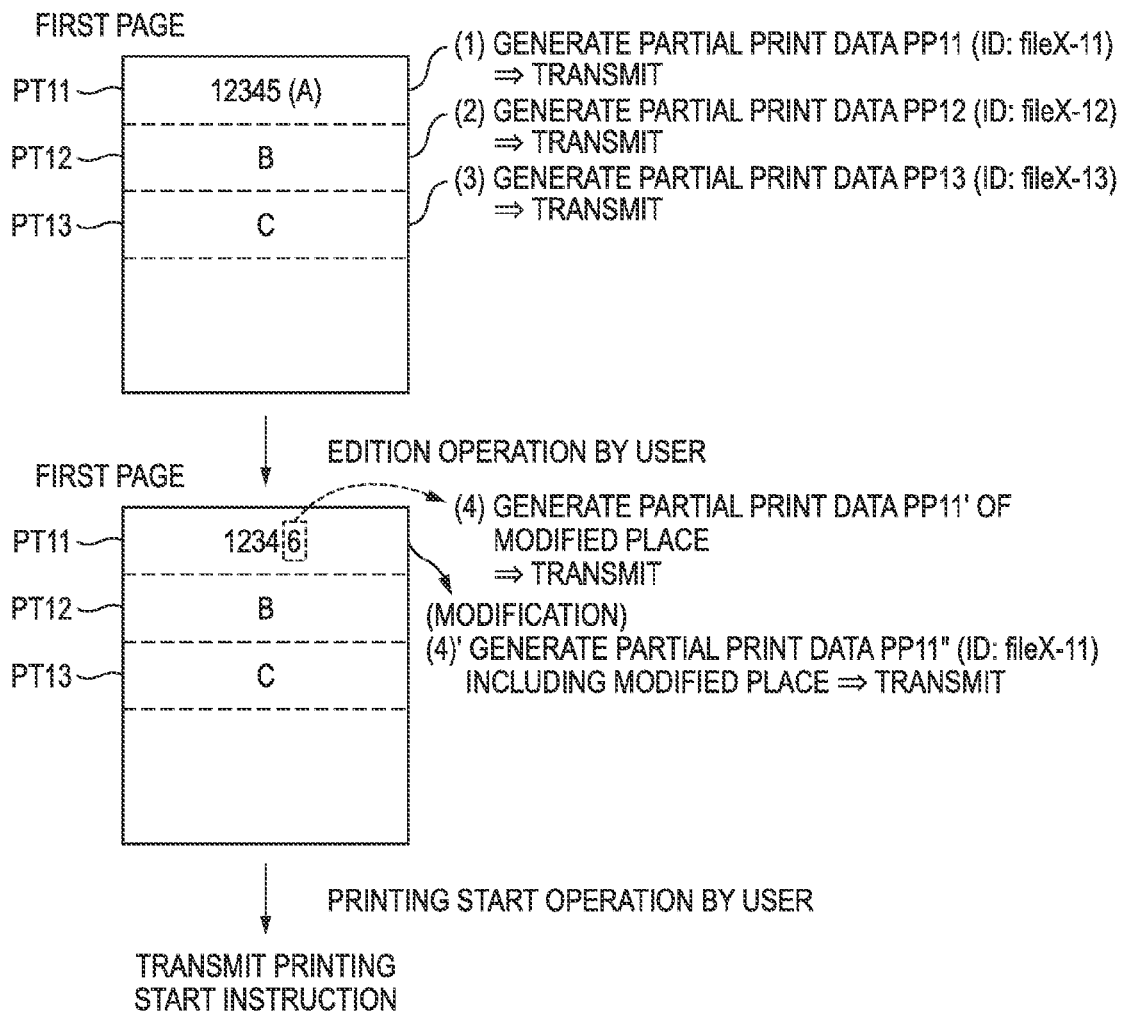

TERMINAL DEVICE USED TO TRANSMIT IMAGE DATA FOR RAPID PRINTING

CROSS-REFERENCE TO RELATED APPLICATIONS

This application claims priority from Japanese Patent Application No. 2011-189381 filed on Aug. 31, 2011, the entire subject matter of which is incorporated herein by reference.

TECHNICAL FIELD

The present invention relates to a technique for a terminal device connectable to a printer.

BACKGROUND

There have been disclosed a document operation terminal which is connected to a printer. The document operation terminal converts document data to be printed before a user issues a print instruction to the document operation terminal, and generates print data. The document operation terminal transmits the generated print data to the printer after the user has issued the print instruction.

SUMMARY

A user usually wants to rapidly acquire a printing result. Illustrative aspects of the invention provide a technique for rapidly providing the printing result to the user.

According to one illustrative aspect of the invention, there is provided a non-transitory computer-readable medium having a computer program stored thereon and readable by a computer mounted in a terminal device that is configured to be connected to a printer. The computer program, when executed by the computer, causes the computer to perform operations comprising: a first print data generation process; a first print data transmission process; and an instruction transmission process. The first print data generation process is for generating first print data corresponding to a first specific image which is at least a portion of a target image to be printed, wherein the first print data is generated before a specific operation to cause the printer to start printing using the first print data is carried out in an operating unit of the terminal device. The first print data transmission process is for transmitting the first print data to the printer before the specific operation is carried out. The instruction transmission process is for, when the specific operation is carried out, transmitting a printing start instruction to cause the printer to start printing using the first print data to the printer.)

In the computer program, the terminal device transmits the first print data to the printer before the specific operation is carried out. When the specific operation is carried out after the first print data is transmitted, the terminal device transmits the printing start instruction to the printer. Upon receiving the printing start instruction, the printer starts printing using the received first print data. According to this configuration, the printer can rapidly start printing using the first print data compared to a configuration in which, after the specific operation is carried out in the terminal device, the terminal device transmits the first print data to the printer. Therefore, it is possible to rapidly provide a printing result to the user.

According to another illustrative aspect of the invention, there is provided a terminal device configured to be connected to a printer. The terminal device comprises: an operating unit; and a controller. The controller is configured to: generate first print data corresponding to a first specific image, which is at least a portion of a target image to be printed, wherein the first print data is generated before a specific operation to cause the printer to start printing using the first print data is carried out in the operating unit; transmit the first print data to the printer before the specific operation is carried out; and transmit a printing start instruction to cause the printer to start printing using the first print data to the printer when the specific operation is carried out.

Incidentally, a storage medium having the computer program stored thereon, the terminal device, and a control method for realizing the terminal device are new and useful.

A printer to be connected to the terminal device is also useful. For example, according to still another illustrative aspect of the invention, there is provided a printer configured to be connected to a terminal device. The printer comprises: a printing execution unit configured to execute printing; and a controller. The controller is configured to: receive first print data from the terminal device, wherein the first print data is received before a specific operation to cause the printer to start printing using the first print data is carried out in an operating unit of the terminal device; and after the first print data is received, receive a printing start instruction from the terminal device, wherein the printing start instruction is an instruction transmitted from the terminal device when the specific operation is carried out in the operating unit of the terminal device. The printing execution unit executes printing using the first print data upon receiving the printing start instruction.

According thereto, the printer can rapidly execute printing using the first print data. Therefore, it is possible to rapidly provide a printing result to the user.

Incidentally, a control method for realizing the printer, a computer program, and a computer-readable medium having the computer program stored thereon are new and useful. A system including the terminal device and the printer is new and useful.

BRIEF DESCRIPTION OF THE DRAWINGS

FIG. 9 is a diagram illustrating a case (case C) where target data is already included in a target data file and target data is added; and FIG. 10 is a diagram illustrating a case (case D) where target data is already included in a target data file and target data is modified.

DETAILED DESCRIPTION

Configuration of Network System 2

Figure 1:
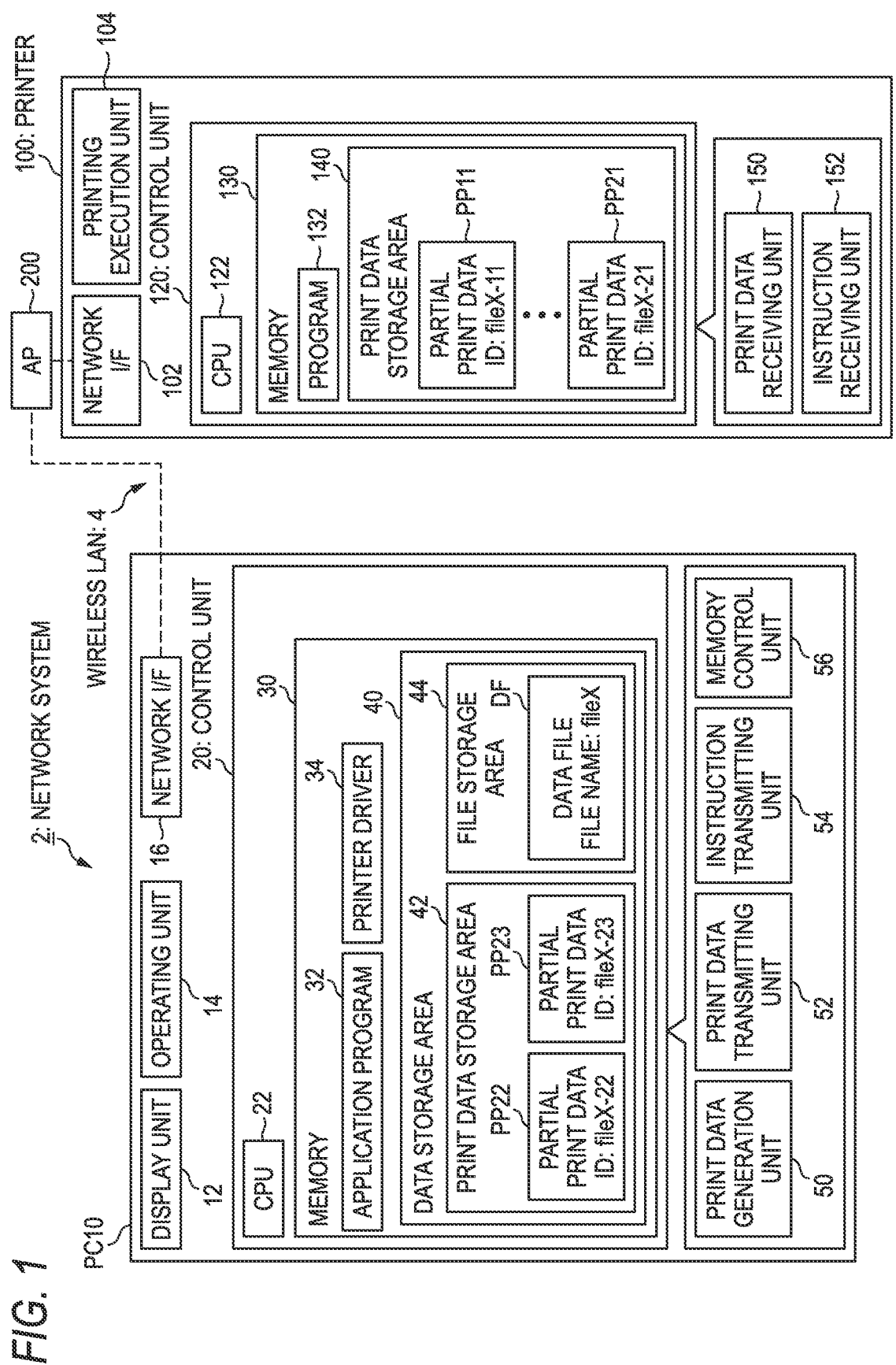
FIG. 1 shows the configuration of a network system.

As shown in FIG. 1, a network system 2 includes a printer 100 and a PC 10 (which is a peripheral of the printer 100). The PC 10 is connected to the printer 100 wirelessly through a wireless LAN 4. The wireless LAN 4 includes an access point 200. In FIG. 1, a dashed line in the wireless LAN 4 indicates that the devices (for example, the PC 10 and the access point 200) at both ends of the dashed line are connected to each other wirelessly.

(Configuration of PC 10)

The PC 10 includes a display unit 12, an operating unit 14, a network interface 16, and a control unit 20 (one example of a controller). The display unit 12 displays various kinds of information in response to an instruction of the control unit 20. The operating unit 14 includes a keyboard and a mouse. The PC 10 performs communication with the printer 100 connected to the wireless LAN 4 through the network interface 16.

The control unit 20 includes a CPU 22 and a memory 30. The CPU 22 performs various processes in accordance with a printer driver 34 stored in the memory 30. Accordingly, the functions of a print data generation unit 50, a print data transmitting unit 52, an instruction transmitting unit 54, and a memory control unit 56 are realized. For example, the user may install the printer driver 34 stored in a computer-readable recording medium (for example, a CD-ROM) on the PC 10.

The memory 30 further stores an application program 32. The application program 32 is a program for generating a data file including document data. Incidentally, in a modification, the application program 32 may be a spreadsheet program, a drawing program, or the like.

The memory 30 includes a data storage area 40. The data storage area 40 includes a print data storage area 42 and a file storage area 44. The print data storage area 42 can store print data generated by the CPU 22 in accordance with the printer driver 34.

The file storage area 44 can store a data file. The file storage area 44 can store a data file acquired from an external storage device (for example, a server (not shown) connected to the PC 10 through the wireless LAN 4 or a storage medium, such as a CDROM). The file storage area 44 can store a data file generated by the CPU 22 in accordance with the application program 32. A data file to be printed in a process of FIG. 2 described below may be a data file acquired from outside the PC 10 or may be a data file generated by the PC 10 itself.

(Application Program 32)

The user can operate the operating unit 14 to activate the application program 32. The user can carry out an operation according to the application program 32 in the operating unit 14. An operation according to the application program 32 includes, for example, a generation operation to generate a new data file and an edition operation to edit data (character data, photograph data, or the like) in an existing data file. The edition operation includes an operation to input character data, photograph data, or the like to a data file and an operation to erase character data or the like in a data file. If the user carries out an operation in the operating unit 14, the CPU 22 performs a process based on the operation in accordance with the application program 32. For example, if a generation operation is carried out, the CPU 22 generates a new data file in the file storage area 44 (in FIG. 1, a data file DF). The user can operate the operating unit 14 to determine the file name of the data file DF (in FIG. 1, "fileX").

Incidentally, in a modification, the application program 32 may not be stored in the PC 10. For example, as in a cloud computing system, the application program 32 may be stored in a server (not shown) connected to the wireless LAN 4. In this modification, the CPU 22 may perform various processes in accordance with the application program 32 in the server.

(Configuration of Printer 100)

The printer 100 includes a network interface 102, a printing execution unit 104, and a control unit 120 (one example of a controller). The printer 100 is configured to perform communication with the PC 10 connected to the wireless LAN 4 through the network interface 102. The printing execution unit 104 executes printing using print data in response to an instruction of the CPU 122.

The control unit 120 includes a CPU 122 and a memory 130. The CPU 122 performs various processes in accordance with a program 132 stored in the memory 130. Accordingly, the functions of a print data receiving unit 150 and an instruction receiving unit 152 are realized.

The memory 130 includes a print data storage area 140. The CPU 122 stores print data (for example, partial print data PP11 to PP21 described below) received from the PC 100 in the print data storage area 140. The CPU 122 controls the printing execution unit 104 to execute printing using print data in the print data storage area 140.

(Process Performed by PC 10)

The content of the process performed by the CPU 22 of the PC 10 will be described with reference to the drawings.

(Print Data Generation Process)

The content of the print data generation process will be described with reference to FIG. 2. This process is started when the PC 10 is powered on. The user can operate the operating unit 14 to carry out a display operation to cause the display unit 12 to display a display image represented by data of the data file DF in the data storage area 44. In S12, the CPU 22 monitors the execution of a display operation or a generation operation of a new data file.

If the display operation is executed, the CPU 22 causes the display unit 12 to display the display image in accordance with the application program 32. If the generation operation is executed, the CPU 22 generates a new data file in the file storage area 44 in accordance with the application program 32, and causes the display unit 12 to display a new image. The new image includes a blank page of a paper size (for example, A4 size) set in advance in the application program 32. In the following description, a data file selected by the display operation or a data file generated by the generation operation is called "target data file", and data (including data to be added by the edition operation of the user) representing an image (character, photograph, graph, figure, or the like) is called "target data".

If the display operation or the generation operation is carried out (YES in S12), in S14, the CPU 22 determines whether or not target data representing an image equal to or greater than a predetermined size set in advance is included in a target data file. The predetermined size is equal to a size of one target region when the paper size of one sheet set in the target data file is equally divided into a plurality of (for example, five) target regions in the longitudinal direction. When an image (character, photograph, figure, or the like) is included in a target region subsequent to the leading target region from among a plurality of target regions of the first page, in S14, the CPU 22 determines to be YES. Even if no image is included in the leading target region (that is, the leading target region is blank), when an image is included in a target region subsequent to the leading target region, in S14, it is determined to be YES.

When it is determined in S14 to be YES, the process proceeds to S16. When it is determined in S14 to be NO, the process proceeds to S26. In S16, the print data generation unit 50 duplicates one piece of partial target data corresponding to the leading target region (that is, one piece of partial target data representing an image included in the leading target region), and converts the duplicated one piece of partial target data to generate one piece of partial print data. In detail, the print data generation unit 50 performs an image process including a color conversion process (from RGB to CMYK) and a halftone process on one piece of partial target data so as to generate one piece of partial print data in a format analyzable by the printer 100. In S16, the print data generation unit 50 generates one piece of partial print data in the print data storage area 42. Incidentally, when no image is included in the leading target region (that is, the leading target region is blank), the print data generation unit 50 generates one piece of partial print data representing blank.

In S16, the print data generation unit 50 assigns identification information (that is, ID) to the generated one piece of partial print data. The ID includes the file name of the target data file DF, a page number which represents a page including one target region corresponding to the generated one piece of partial data, and a sequence of the one target region in the page. For example, when one piece of partial print data corresponding to the leading target region of the first page is generated for the target data file DF having the file name "fileX", the print data generation unit 50 assigns the ID "fileX-11" which is a combination of the file name "fileX", the page number "1", and the sequence "1" of the target region in the page.

In S16, the print data generation unit 50 stores, in the memory 30, generation completion information indicating that one piece of partial print data is generated. The generation completion information includes positional information representing the position of one target region corresponding to the generated one piece of partial print data (for example, information indicating "0 mm to 50 mm in the longitudinal direction of the first page") and the ID of the generated one piece of partial print data.

Next, in S18, the print data transmitting unit 52 determines whether or not the printer 100 is able to store the one piece of partial print data generated in S16. Though will be specifically described below, when the free space for storing one piece of partial print data remains in the print data storage area 140 (NO in S114 of FIG. 5 described below), the printer 100 transmits, to the PC 10, storage impossible information indicating that partial print data is not storable. When the storage impossible information is received from the printer 100, the CPU 22 of the PC 10 stores the storage impossible information in the memory 30.

In S18, when the storage impossible information is stored in the memory 30, the print data transmitting unit 52 determines that partial print data is not storable (NO in S18). When the storage impossible information is not stored in the memory 30, it is determined that partial print data is not storable (YES in S18).

When it is determined in S18 to be NO, the process returns to S14. In this case, one piece of partial print data generated in S16 is maintained in the print data storage area 42. On the other hand, when it is determined in S18 to be YES, in S22, the print data transmitting unit 52 transmits one piece of partial print data generated in S16 to the printer 100 through the network interface 16 and the wireless LAN 4. Next, in S24, the memory control unit 56 erases the one piece of partial print data transmitted in S22 from the print data storage area 42, and returns to S14.

Incidentally, in S14 on or after the second time, the CPU 22 determines a target region next to the position which is represented by the positional information represented by the generation completion information in the memory 30 (when a plurality of pieces of generation completion information are stored in the memory 30, positional information representing the last position) as a target region to be processed, and the process after S16 is performed using one piece of partial target data corresponding to the determined target region. In S16 on or after the second time, the print data generation unit 50 assigns the ID "fileX-αβ" to the generated one piece of partial print data using the file name "fileX" of the target data file DF, the page number "α" which represents a page including the target region to be processed, and the sequence "β" of the target region to be processed in the page. When no image is included in target regions subsequent to the target region to be processed, for example, it is determined to be NO in S14, and the process proceeds to S26.

Figure 3:
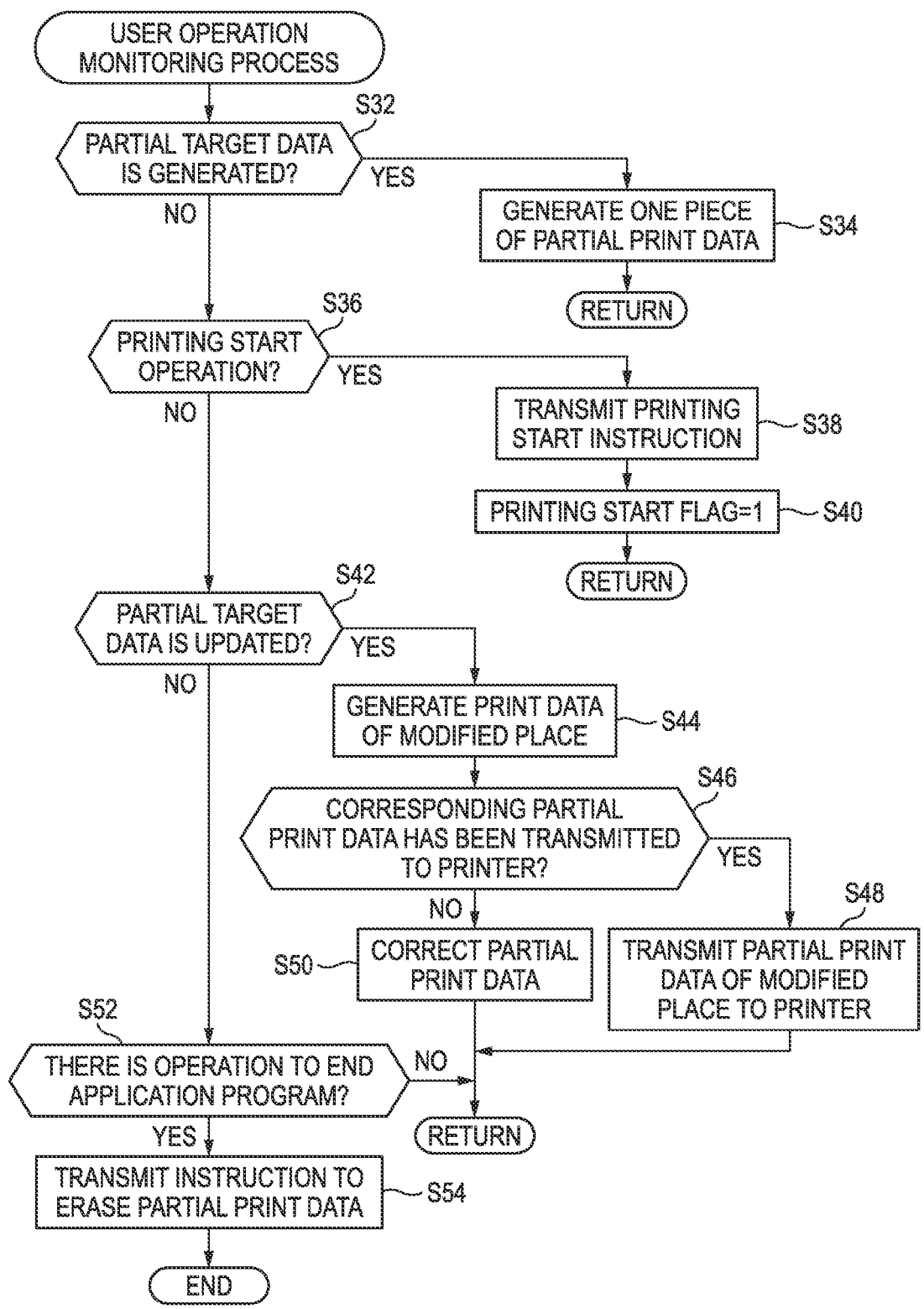
FIG. 3 is a flowchart showing a user operation monitoring process performed by the PC.
Figure 4:
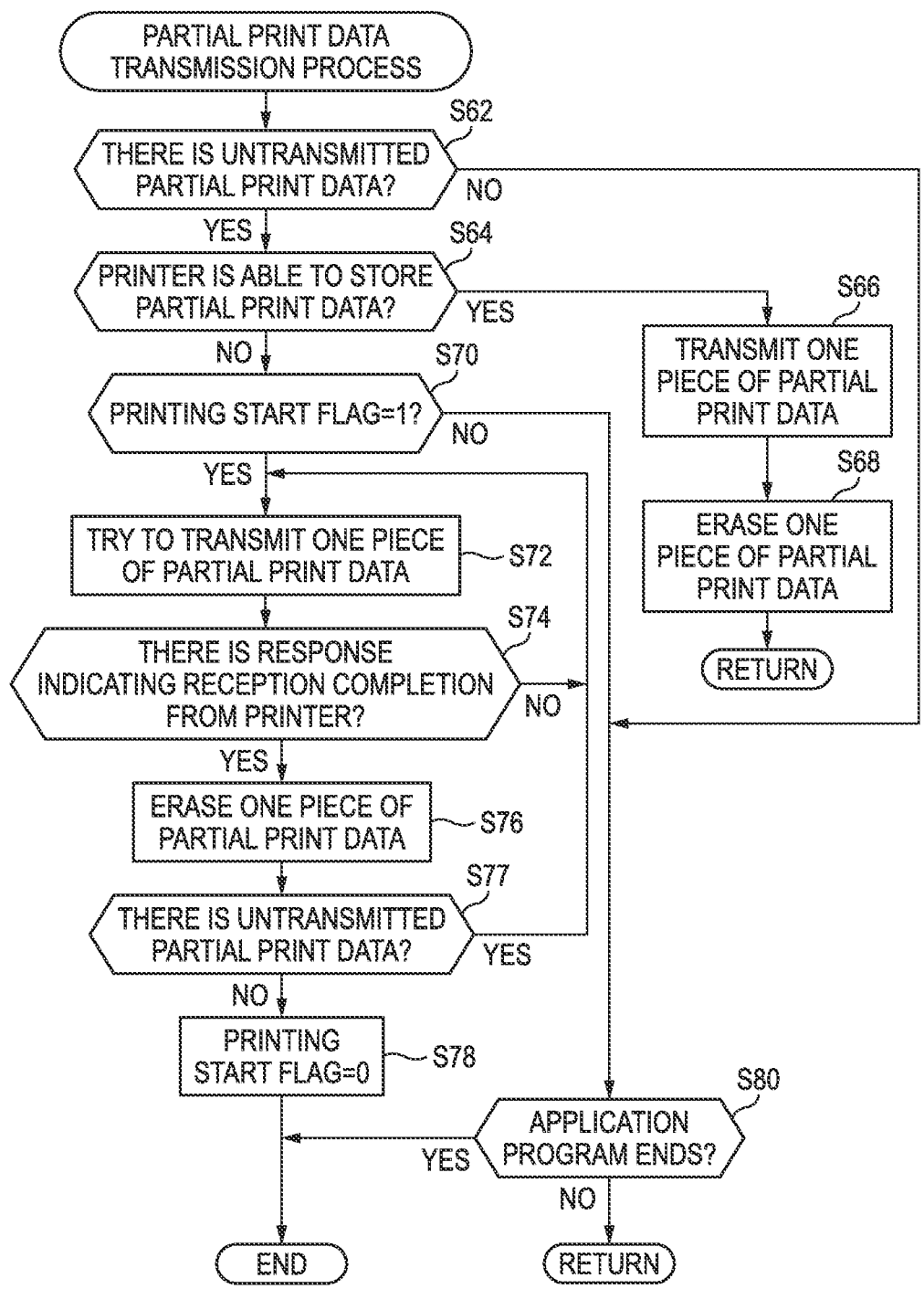
FIG. 4 is a flowchart of a partial print data transmission process performed by the PC.

In S26, the CPU 22 activates a partial print data transmission process (see FIG. 4). Next, in S28, the CPU 22 performs a user operation monitoring process (see FIG. 3). The CPU 22 performs the partial print data transmission process and the user operation monitoring process in parallel. If the user operation monitoring process ends, the process returns to S12.

(User Operation Monitoring Process)

Next, the content of the user operation monitoring process performed in S28 of FIG. 2 will be described with reference to FIG. 3. As described above, the user operates the operating unit 14 to carry out an edition operation to edit partial target data representing an image displayed on the display unit 12 or to add new partial target data.

In S32, the print data generation unit 50 determines whether or not new partial target data is added. Specifically, when partial target data representing an image equal to or greater than the predetermined size is added (newly generated), in S32, the print data generation unit 50 determines to be YES, and the process proceeds to S34.

In S34, the print data generation unit 50 converts the one piece of partial target data which is determined in S32 to be YES to generate one piece of partial print data in the print data storage area 42. The print data generation unit 50 assigns the ID to the generated one piece of partial print data and stores the generation completion information in the memory 30. Then, the process returns to S32. The process of S34 is the same as the process of S16 of FIG. 2.

In S36, the instruction transmitting unit 54 monitors a predefined printing start operation which is carried out by the user in the operating unit 14 of the PC 10. The printing start operation is an operation which causes the printer 100 to start printing using generated one or more pieces of partial print data. When the printing start operation is carried out (YES in S36), the process proceeds to S38. When the printing start operation is not carried out (NO in S36), the process proceeds to S42.

In S38, the instruction transmitting unit 54 transmits a printing start instruction to cause the printer 100 to start printing one or more pieces of partial print data to the printer 100. The instruction transmitting unit 54 transmits the printing start instruction including the file name (for example, "fileX") of the target data file. Next, in S40, the CPU 22 changes a printing start flag in the memory 30 from "0" to "1", and returns to S32.

In S42, the print data generation unit 50 determines whether or not partial target data is modified by an edition operation (for example, an operation to input characters or the like or an operation to erase characters or the like). Specifically, when the user carries out the edition operation in a state in which a cursor displayed on the display unit 12 is placed in an image represented by generated partial target data (this is determined using the position of the cursor and the positional information in the generation completion information), the print data generation unit 50 determines to be YES in S42.

When it is determined in S42 to be YES, the process proceeds to S44. When it is determined in S42 to be NO, the process proceeds to S52. In S44, the print data generation unit 50 generates partial print data of a modified portion in the print data storage area 42. For example, when the characters "AA" is modified to the characters "AB" by the edition operation, the print data generation unit 50 generates partial print data representing the character "B", and does not generate partial print data corresponding to partial target data (the leading character "A") having not been modified by the edition operation. The print data generation unit 50 generates modification information which includes the ID of partial print data before modification and modified place information representing the position of partial print data generated in S44 in partial print data before modification.

Next, in S46, the print data transmitting unit 52 determines whether or not partial print data before modification has been transmitted to the printer 100. Specifically, partial print data before modification identified by the ID included in the modification information generated in S44 is stored in the print data storage area 42, the print data transmitting unit 52 determines that partial print data before modification has not been transmitted to the printer 100 (NO in S46). When partial print data is not stored in the print data storage area 42, it is determined that the partial print data has been transmitted to the printer 100 (YES in S46).

When it is determined in S46 to be YES, in S48, the print data transmitting unit 52 transmits the partial print data (in the above example, partial print data representing the character "B") generated in S44 and the modification information to the printer 100, and the process returns to S32. On the other hand, when it is determined in S46 to be NO, in S50, the print data generation unit 50 corrects partial print data before modification using the partial print data generated in S44 and the modification information, and the process returns to S32. Specifically, first, the print data generation unit 50 specifies partial print data before modification identified by the ID included in the modification information. Next, the print data generation unit 50 substitutes data (data included in partial print data before modification) of a place indicated by the modified place information included in the modification information with the partial print data generated in S44.

In S52, the CPU 22 determines whether or not an end operation to end the application program 32 is carried out by the user in the operating unit 14. When the end operation is not carried out (NO in S52), the process returns to S32. Meanwhile, the user does not want to execute printing of an image represented by target data (does not carry out the printing start operation (see S36)), and may carry out the end operation. In this case, in S52, the CPU 22 determines to be YES, and the process proceeds to S54.

In S54, the instruction transmitting unit 54 transmits an erasure instruction to erase partial print data in the printer 100 and ends the process. The erasure instruction includes the file name (for example, "fileX") of target data. In S54, when the storage impossible information is stored in the memory 30, the memory control unit 56 erases the storage impossible information. In S54, when one or more pieces of partial print data generated from target data are stored in the print data storage area 42, the memory control unit 56 erases partial print data. The CPU 22 ends the application program 32.

(Partial Print Data Transmission Process)

Next, the content of the partial print data transmission process started in S26 of FIG. 2 will be described with reference to FIG. 4. In S62, the print data transmitting unit 52 determines whether or not at least one piece of partial print data is stored in the print data storage area 42. When at least one piece of partial print data is stored (YES in S62), the process proceeds to S64. When no partial print data is stored (NO in S62), the process proceeds to S80.

In S64, the print data transmitting unit 52 determines whether or not the printer 100 is able to store partial print data. When the storage impossible information is stored in the memory 30, the print data transmitting unit 52 determines that the printer 100 is unable to store partial print data (NO in S64), and the process proceeds to S70. When the storage impossible information is not stored in the memory 30, it is determined that the printer 100 is able to store partial print data (YES in S64), and the process proceeds to S66.

In S66, the print data transmitting unit 52 selects one piece of partial print data representing a foremost image from among one or more pieces of partial print data in the print data storage area 42, and transmits the selected one piece of partial print data to the printer 100. Specifically, the print data transmitting unit 52 selects partial print data to which an ID having the smallest numeral after "- (hyphen)" from among the IDs of one or more pieces of partial print data in the print data storage area 42 is assigned. Next, in S68, the memory control unit 56 erases the one piece of partial print data transmitted in S66 from the print data storage area 42 and returns to S62.

In S70, the CPU 22 determines whether or not the printing start flag (see S40 of FIG. 3) in the memory 30 is "1". When the printing start flag is "0" (NO in S70), the process proceeds to S80. On the other hand, when the printing start flag is "1" (YES in S70), in S72, the print data transmitting unit 52 selects one piece of partial print data from among one or more pieces of partial print data in the print data storage area 42 by the same method as in S66. The print data transmitting unit 52 tires to transmit the selected one piece of partial print data to the printer 100. Incidentally, in S72, while the storage impossible information is stored in the memory 30 (while it is determined in S70 to be YES), the print data transmitting unit 52 tries to transmit the partial print data.

In S74, the CPU 22 monitors the reception of a response indicating that the reception of one piece of partial print data transmitted in S72 is completed from the printer 100. When no response is received (NO in S74), the process returns to S72, and the print data transmitting unit 52 tries to transmit one piece of partial print data. Though will be described below in detail, if printing of one printing sheet is completed, the printer 100 deletes the respective pieces of partial print data used for printing of the printing sheet from the print data storage area 140. As a result, since the printer 100 is unable to store partial print data in S72 of the previous time, the printer 100 is unable to receive partial print data, in S72 of the next time, the printer 100 may receive partial print data.

When a response is received (YES in S74), in S76, the memory control unit 56 erases the one piece of partial print data transmitted in S72 from the print data storage area 42. Next, in S77, the print data transmitting unit 52 determines whether or not at least one piece of print data is stored in the print data storage area 42. When at least one piece of partial print data is stored (YES in S77), the process returns to S72. When no partial print data is stored (NO in S77), in S78, the CPU 22 changes the printing start flag in the memory 30 from "1" to "0", and the process ends. In S78, the memory control unit 56 erases the storage impossible information from the memory 30.

In S80, the CPU 22 determines whether or not the application program 32 has ended. When the application program 32 has ended (YES in S80), the process ends. When it is determined in S80 to be YES, the memory control unit 56 erases the storage impossible information from the memory 30. On the other hand, when the application program 32 has not ended (NO in S80), the process returns to S62.

(Process which is Performed by Printer 100)

Figure 5:
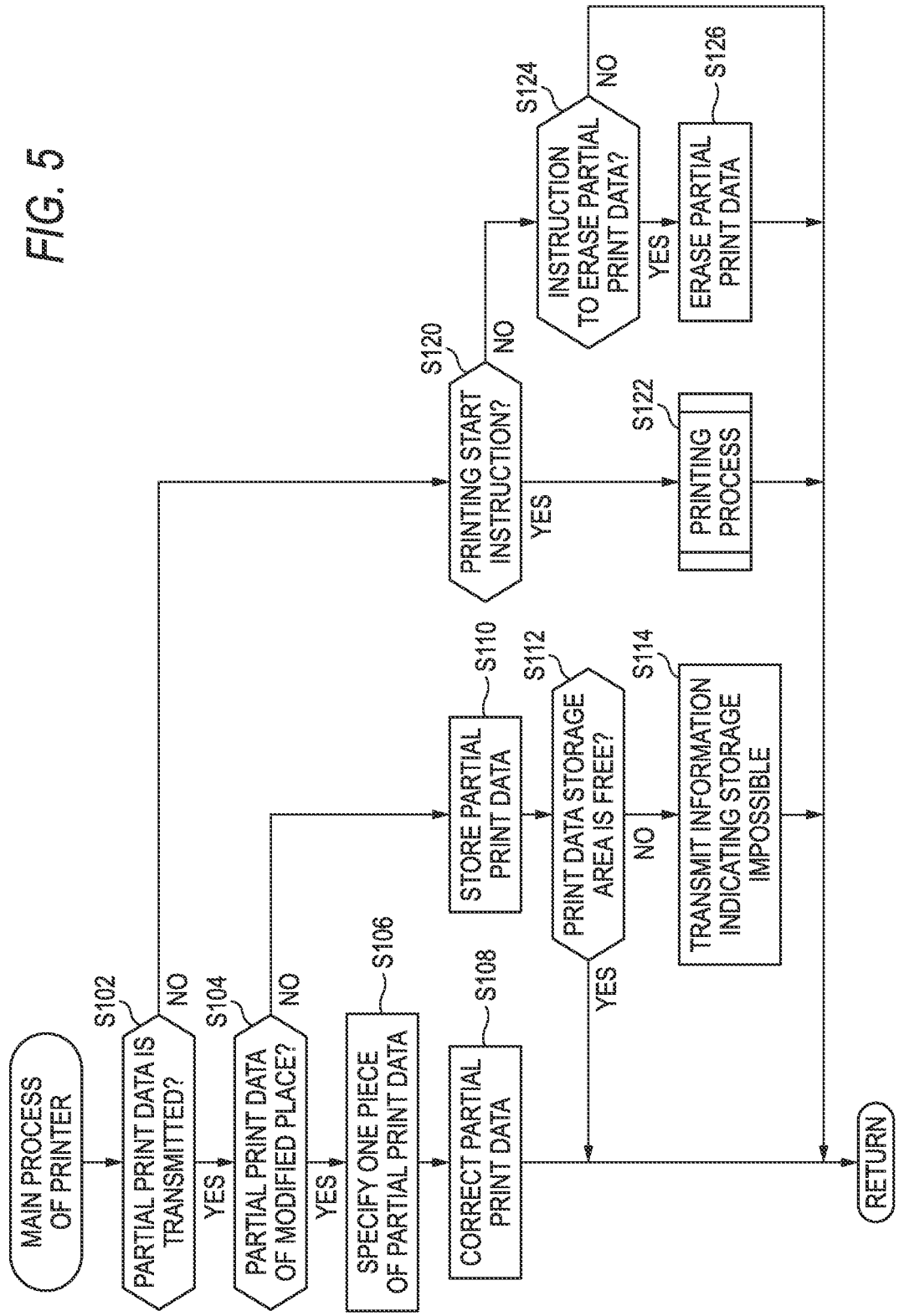
FIG. 5 is a flowchart of a main process performed by a printer.

Next, the content of the process which is performed by the CPU 122 of the printer 100 will be described with reference to the drawing. As shown in FIG. 5, in S102, the print data receiving unit 150 monitors the reception of one piece of partial print data from the PC 10. When partial print data is received (YES in S102), the process proceeds to S104. When no partial print data is received (NO in S102), the process proceeds to S120.

In S104, the CPU 122 determines whether or not the partial print data received in S102 is partial print data of a modified place for modifying partial print data in the print data storage area 140. Specifically, when the modification information is received together with the partial print data (see S48 of FIG. 3), in S104, the CPU 122 determines to be YES. When the modification information is not received together with the partial print data (see S22 of FIG. 2, S66 and S72 of FIG. 4), in S104, it is determined to be NO.

When it is determined in S104 to be YES, in S106, the CPU 122 specifies partial print data identified by the ID included in the modification information from the print data storage area 140. Next, in S108, the CPU 122 corrects the partial print data specified in S106 using the partial print data of the modified place received in S102. A correction method which is executed by the CPU 122 is the same as the correction method which is executed by the PC 10 in S50 of FIG. 3. If S108 ends, the process returns to S102.

On the other hand, when it is determined in S104 to be NO, in S110, the CPU 122 stores the partial print data received in S102 in the print data storage area 140. Next, in S112, if one piece of partial print data is further received from the PC 10, the CPU 122 determines whether or not the one piece of partial print data can be stored in the print data storage area 140. That is, the CPU 122 determines whether or not the free space for storing one piece of next partial print data remains in the print data storage area 140. When the free space remains (YES in S112), the process returns to S102. On the other hand, when no free space remains (NO in S112), in S114, the CPU 122 transmits the storage impossible information to the PC 10, and returns to S102. As a result, the PC 10 stores the storage impossible information in the memory 30.

In S120, the instruction receiving unit 152 monitors the reception of the printing start instruction (see S38 of FIG. 3) from the PC 10. When the printing start instruction is received (YES in S120), in S122, the CPU 122 performs a printing process (see FIG. 6), and returns to S102. On the other hand, when the printing start instruction is not received (NO in S120), in S124, the instruction receiving unit 152 monitors the reception of the erasure instruction (S54 of FIG. 3) from the PC 10. When the erasure instruction is received (YES in S124), in S126, the CPU 122 erases all pieces of partial print data (for example, "fileX-11" and the like) including the file name (for example, "fileX") in the erasure instruction from the print data storage area 140, and returns to S102. When the erasure instruction is not received (NO in S124), the process returns to S102.

(Printing Process)

Figure 6:
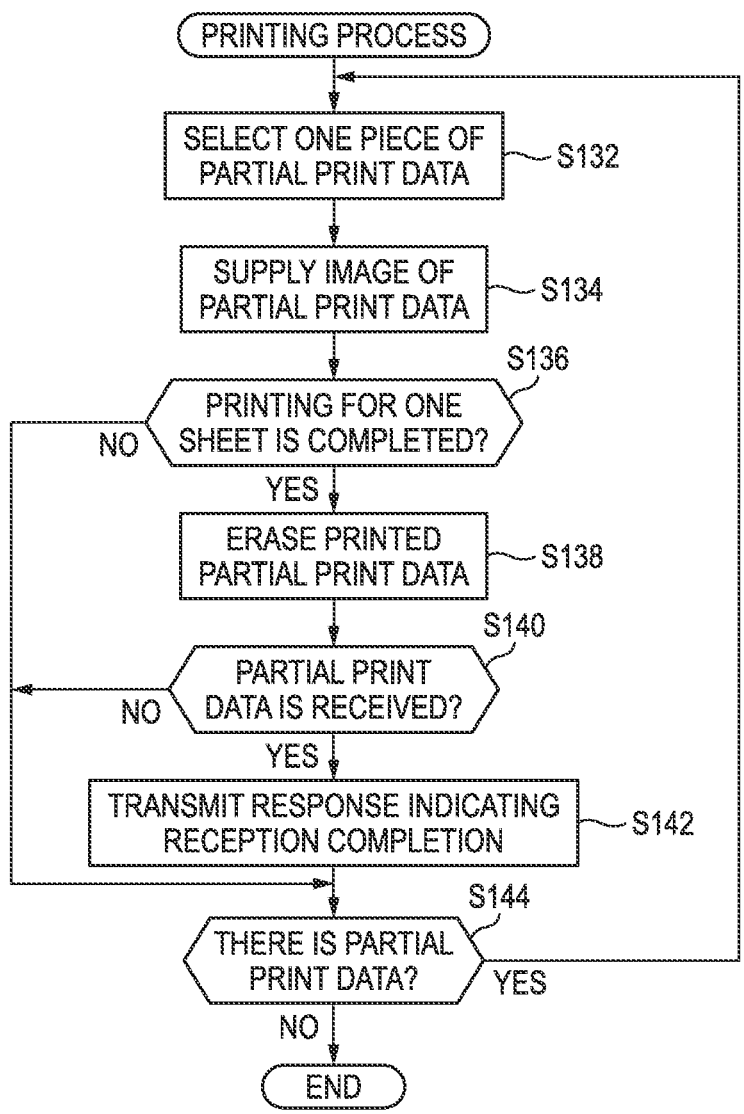
FIG. 6 is a flowchart of a printing process performed by the printer.

Next, the content of the printing process in S122 of FIG. 5 will be described with reference to FIG. 6. In S132, the CPU 122 first specifies all pieces of partial print data (for example, "fileX-11" and the like) including the file name (for example, "fileX") in the printing start instruction received in S120 of FIG. 5 from the print data storage area 140. Next, the CPU 122 selects one piece of partial print data to be initially used for printing using the ID of each piece of specified partial print data (that is, to which the ID representing the foremost position is assigned). Specifically, the CPU 122 selects partial print data to which the ID having the smallest numeral after "-(hyphen)" from among the IDs is assigned. In S134, the CPU 122 supplies the selected one piece of partial print data to the printing execution unit 104. The printing execution unit 104 prints an image represented by the supplied one piece of partial print data on a printing sheet.

Next, in S136, the CPU 122 determines whether or not printing of one printing sheet is completed. When printing of one printing sheet is completed (YES in S136), the process proceeds to S138. When printing of one printing sheet is not completed (NO in S136), the process proceeds to S144.

In S138, the CPU 122 erases the respective pieces of partial print data supplied to the printing execution unit 104 (that is, the respective pieces of partial print data used for printing of one printing sheet) from the print data storage area 140. Accordingly, the print data storage area 140 is released, and partial print data can be newly stored in the print data storage area 140. That is, in S72 of FIG. 4, when the PC 10 tries to transmit partial print data, the printer 100 can receive partial print data (YES in S140 described below), and can store partial print data in the print data storage area 140.

In S140, the print data receiving unit 150 determines whether or not one piece of partial print data is received from the PC 10. When no partial print data is received (NO in S140), the process proceeds to S144. On the other hand, when partial print data is received (YES in S140), the CPU 122 stores partial print data received in S140 in the print data storage area 140. Next, in S142, the CPU 122 transmits a reception completion response (see S74 of FIG. 4) indicating partial print data having been received to the PC 10, and proceeds to S144.

In S144, the CPU 122 determines whether or not at least one piece of partial print data is stored in the print data storage area 140. When at least one piece of partial print data is stored (YES in S144), the process returns to S132. On the other hand, when no partial print data is stored (NO in S144), the process ends.

Examples

Subsequently, various cases (cases A to D) which are realized by the flowcharts of FIGS. 2 to 6 will be described.

(Case A)

Figure 7:
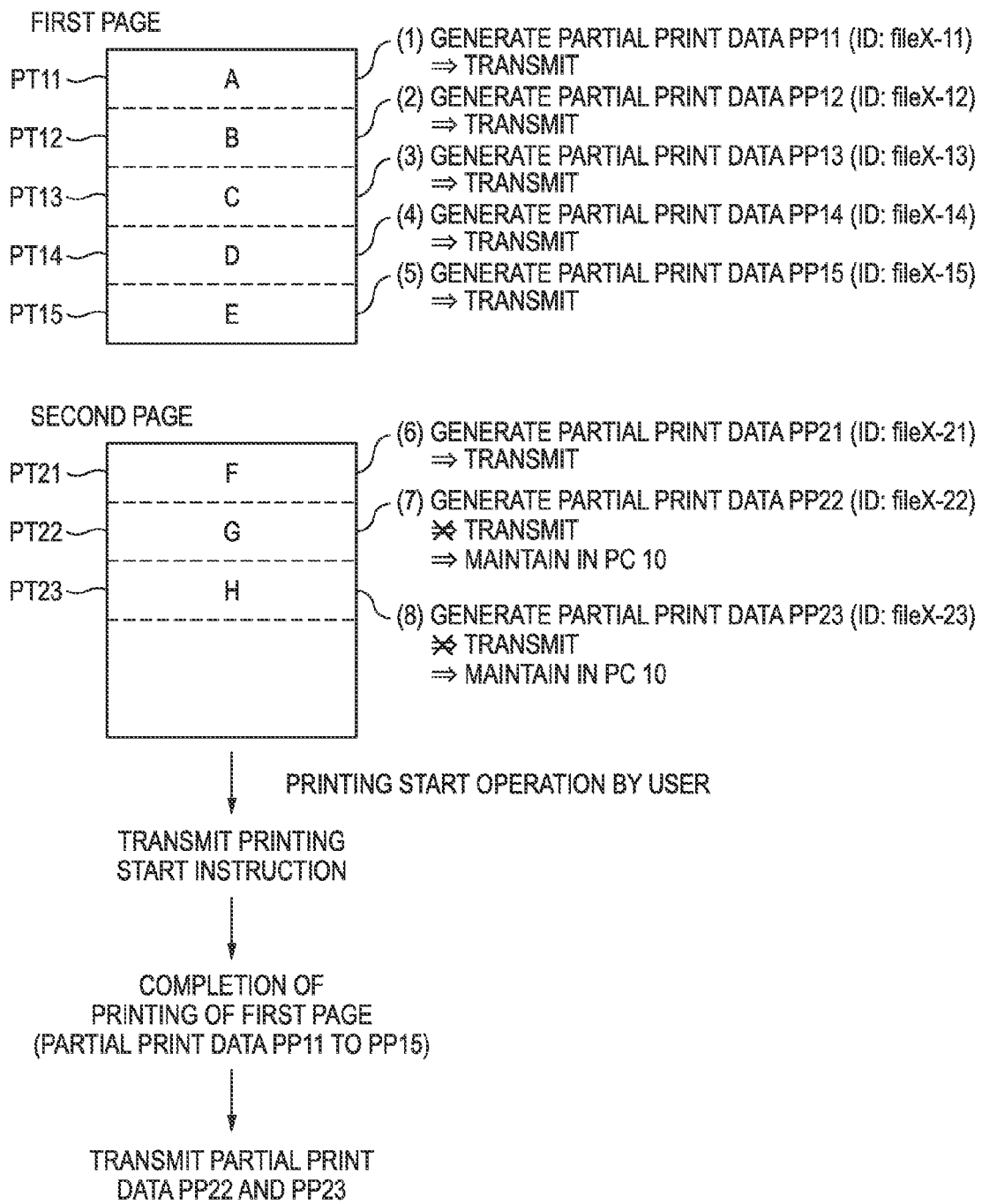
FIG. 7 is a diagram illustrating a case (case A) where target data is already included in a target data file.

The case A of FIG. 7 refers to a case where target data representing an image is already included in the target data file DF (see FIG. 1) of the file storage area 44 of PC 10, and the target data is not edited by the user.

Figure 2:
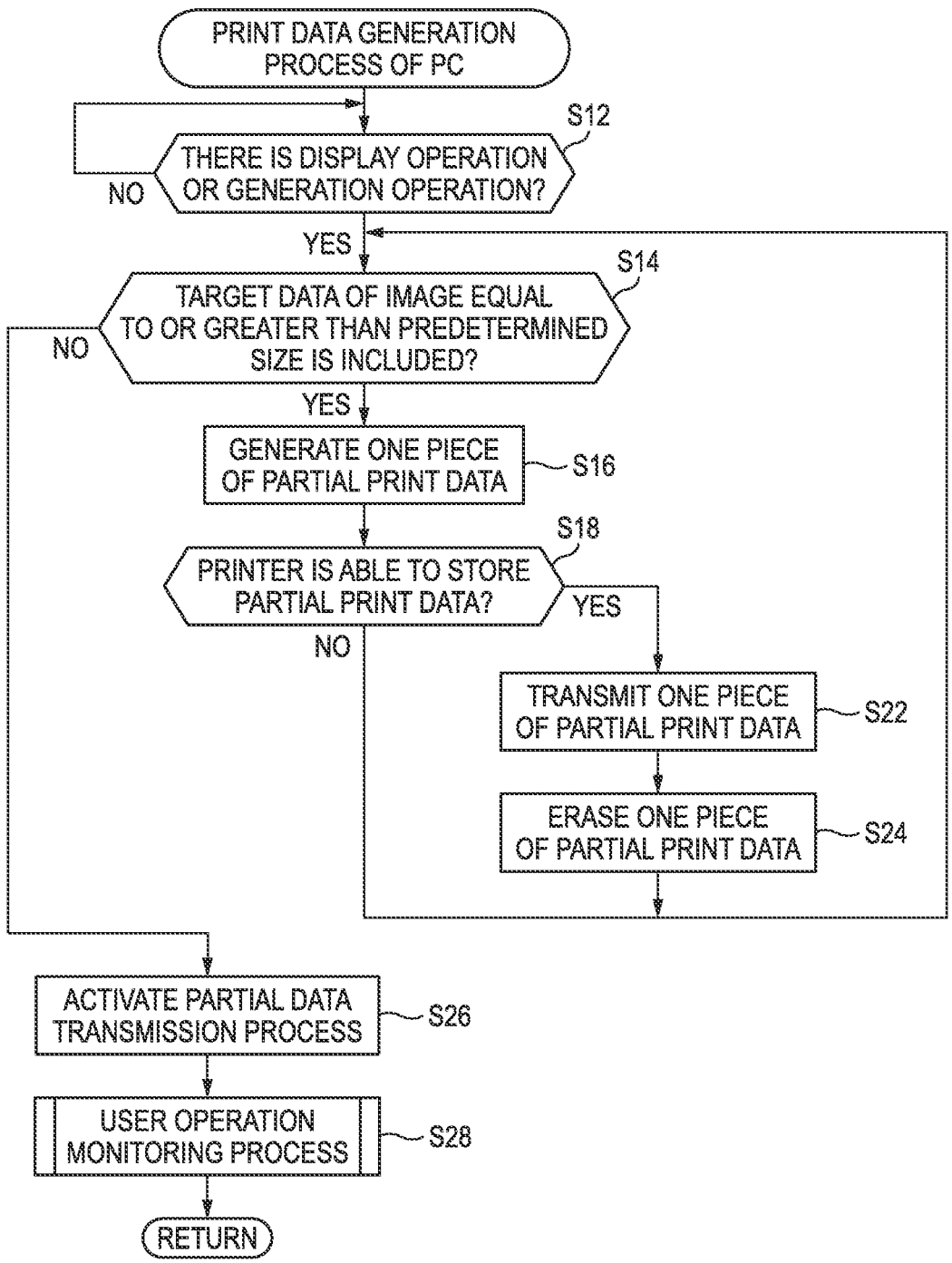
FIG. 2 is a flowchart showing a print data generation process performed by a PC.

If a user operates the operating unit 14 to carry out a display operation of the target data file DF, the CPU 22 of the PC 10 causes the display unit 12 to display a display image represented by target data in the target data file DF (YES in S12 of FIG. 2). The display image includes eight images A to H. The images A to H are of the predetermined size (see S14 of FIG. 2). The print data generation unit 50 generates partial print data PP11 using partial target data PT11 representing the image A before the printing start operation is carried out in the operating unit 14 (S16 of FIG. 2). The print data generation unit 50 assigns the ID "fileX-11" to the partial print data PP11. The print data transmitting unit 52 transmits the partial print data PP11 to the printer 100 before the printing start operation is carried out in the operating unit 14 (S22 of FIG. 2). The memory control unit 56 erases the partial print data PP11 from the print data storage area 42 (S24 of FIG. 2).

Similarly, the print data generation unit 50 sequentially generates five pieces of partial print data PP12 to PP15, and PP21 sequentially using five pieces of partial target data PT12 to PT15, and PT21 representing the images B to F before the printing start operation is carried out in the operating unit 14. The IDs "fileX-12 to fileX-15, and fileX-21 are respectively assigned to these pieces of partial print data PP12 to PP15, and PP21. The print data transmitting unit 52 transmits the respective pieces of partial print data PP12 to PP15, and PP21 to the printer 100 each time the respective pieces of partial print data PP12 to PP15, and PP21 are generated before the printing start operation is carried out in the operating unit 14 (S22 of FIG. 2).

In the configuration of this example, the data size of one piece of print data (that is, one piece of partial print data) assigned with one ID is small compared to a configuration in which target data included in the target data file DF is converted to only one piece of print data assigned with one ID. For example, it is assumed that, while the PC 10 is transmitting print data assigned with a specific ID to the printer 100, wireless connection between the PC 10 and the printer 100 is terminated. In this situation, the PC 10 is to retransmit print data assigned with the specific ID. In this case, if the data size of print data assigned with the specific ID is large, it takes a lot of time to retransmit print data. According to the configuration of this example, when one piece of partial print data assigned with one ID is retransmitted, it is possible to reduce the processing time.

After the partial print data PP21 is transmitted, the CPU 22 receives the storage impossible information from the printer 100. For this reason, the CPU 22 stores the storage impossible information in the memory 30. The print data generation unit 50 generates partial print data PP22 in the print data storage area 42 using partial target data PT22 representing the image G (S16 of FIG. 2). The print data transmitting unit 52 determines that the printer 100 is unable to store the partial print data PP22 (NO in S18 of FIG. 2), and does not transmit the partial print data PP22 to the printer. As a result, the partial print data PP22 is not erased from the print data storage area 42 and is maintained. Similarly, partial print data PP23 generated using partial target data PT23 representing the image H is not erased from the print data storage area 42 and is maintained. With this configuration, when the printer 100 is unable to store partial print data, it is possible to maintain a state where partial print data is stored on the PC 10 side. With this configuration, the PC 10 can transmit partial print data maintained on the PC 10 to the printer 100 at the timing (the erasure timing in S138 of FIG. 6) at which the printer 100 is changed from the state where partial print data is not storable to the state where partial print data is storable.

If the printing start operation is carried out by the user (YES in S36 of FIG. 3), the instruction transmitting unit 54 transmits the printing start instruction to the printer 100 (S38 of FIG. 3). If the printing start instruction is received (YES in S120 of FIG. 5), the printer 100 prints an image of the first page on one printing sheet using the partial print data PP10 to PP15 from among the partial print data PP10 to PP21 in the print data storage area 140 (S134 of FIG. 6). If printing of the first page is completed (YES in S136 of FIG. 6), the printer 100 erases the partial print data PP10 to PP15 from the print data storage area 140 (S138 of FIG. 6). As a result, the print data storage area 140 is released.

If the printing start operation is carried out (YES in S36 of FIG. 3), the printing start flag is changed to "1" (S40 of FIG. 3). As a result, the print data transmitting unit 52 tries to transmit the partial print data PP22 and PP23 stored in the print data storage area 42 to the printer 100 (S72 of FIG. 4). As described above, since the print data storage area 140 is released, the partial print data PP22 and PP23 can be stored in the printer 100.

As described above, the print data transmitting unit 52 transmits the respective pieces of partial print data PP11 to PP15, and PP21 (S66 of FIG. 4) each time the respective pieces of partial print data PP11 to PP15, and PP21 are generated (S34 of FIG. 3) until the storage impossible information is received from the printer 100 (S114 of FIG. 5). If the storage impossible information is received from the printer 100, the print data transmitting unit 52 determines that the printer 100 is unable to store partial print data (NO in S64 of FIG. 4), and does not transmit the partial print data PP22 and PP23 until the printing start operation is carried out (YES in S36 of FIG. 3). If the printing start operation is carried out (YES in S36 of FIG. 3), the print data transmitting unit 52 changes the printing start flag to "1" (S40 of FIG. 3, YES in S70 of FIG. 4), and tries to transmit the partial print data PP22 and PP23 (S72 of FIG. 4). With this configuration, the PC 10 can appropriately transmit partial print data to the printer 100 at the timing at which the printer 100 is able to store partial print data.

(Case B)

Figure 8:
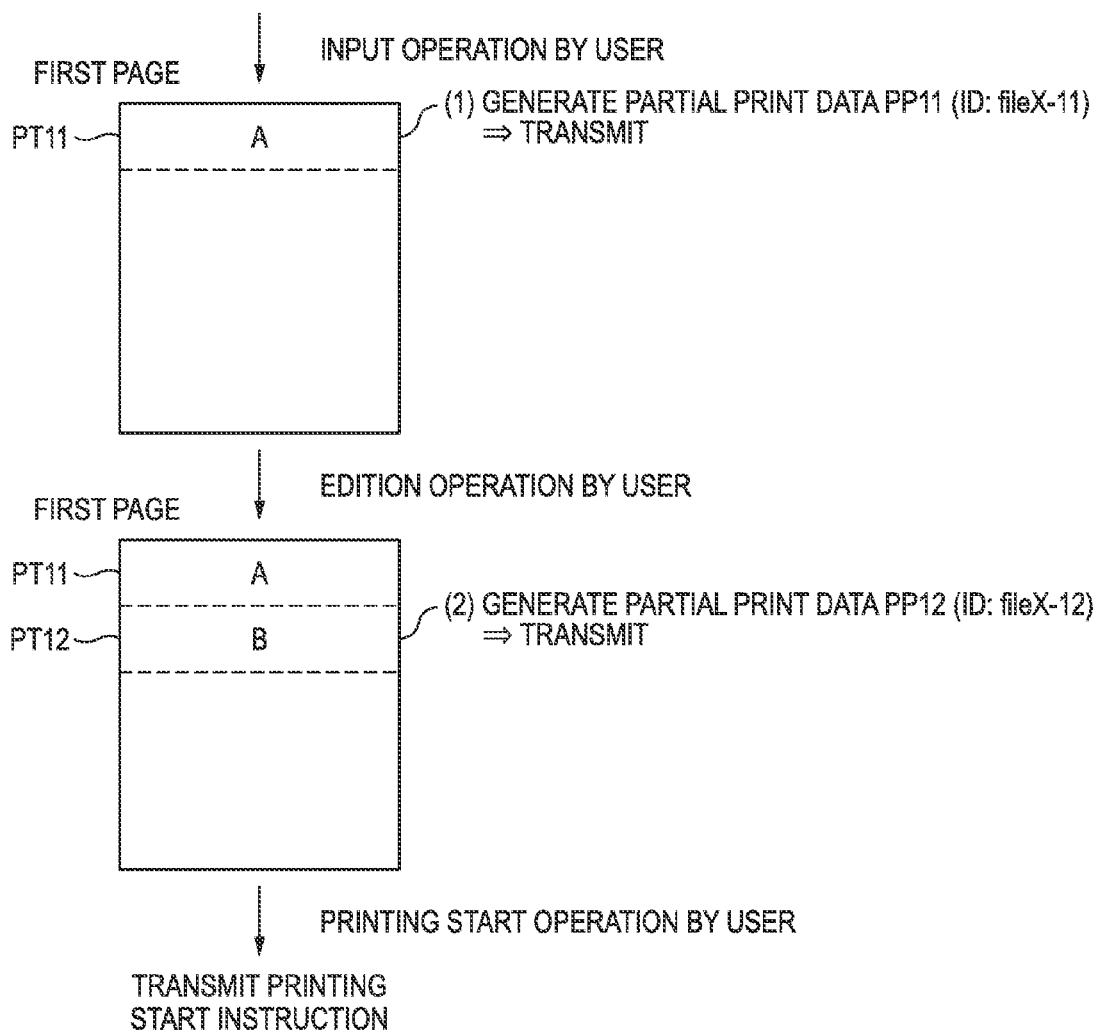
FIG. 8 is a diagram illustrating a case (case B) where a target data file is newly generated.

The case B of FIG. 8 refers to a case where a target data file DF (see FIG. 1) is newly generated.

If the user operates the operating unit 14 to carry out the generation operation to generate a target data file DF, the CPU 22 generates the target data file DF (YES in S12 of FIG. 2). The new target data file DF is blank and does not include target data (character, photograph, figure, graph, or the like). As a result, in S14 of FIG. 2, it is determined to be NO, and the partial print data transmission process of S26 and the user operation monitoring process of S28 are performed. If the edition operation is carried out by the user, and partial target data PT11 representing the image A is generated (YES in S32 of FIG. 3), the print data generation unit 50 converts partial target data PT11 to generate partial print data PP11 (S34 of FIG. 3). The print data transmitting unit 52 transmits partial print data PP11 to the printer 100 (S66 of FIG. 4).

Similarly, if the edition operation is carried out by the user, and partial target data PT12 representing the image B is generated, the print data generation unit 50 generates partial print data PP12 (S34 of FIG. 3). The print data transmitting unit 52 transmits the partial print data PP12 to the printer 100 (S66 of FIG. 4). As described above, with the configuration of this example, each time the respective pieces of partial target data PP11 and PP12 are generated, the PC 10 generates the respective pieces of partial print data and transmits the respective pieces of partial print data to the printer 100. Accordingly, the PC 10 can rapidly generate partial print data and transmit partial print data to the printer 100 compared to a configuration in which a plurality of pieces of partial print data are generated after a plurality of pieces of partial target data are generated. As a result, it is possible to rapidly provide the printing result to the user.

If the printing start operation is carried out (YES in S36 of FIG. 3), the instruction transmitting unit 54 transmits the printing start instruction to the printer 100 (S38 of FIG. 3). The printer 100 executes printing using the partial print data PP11 and PP12 in the print data storage area 140 (S134 of FIG. 6).

(Case C)

The case C of FIG. 9 refers to a case where target data is already included in the target data file DF (see FIG. 1) of the file storage area 44, and target data is newly added.

If the user operates the operating unit 14 to carry out the display operation of the target data file DF, the CPU 22 causes the display unit 12 to display a display image (YES in S12 of FIG. 2). The display image includes three images A to C. The images A to C are of the predetermined size. The print data generation unit 50 sequentially generates three pieces of partial print data PP11 to PP13 in the print data storage area 42 sequentially using three pieces of partial target data PT11 to PT13 (S16 of FIG. 2). The print data transmitting unit 52 transmits the respective pieces of partial print data PP11 to PP13 to the printer 100 each time the respective pieces of partial print data PP11 to PP13 (S22 of FIG. 2).

Thereafter, if the user operates the operating unit 14 to carry out the edition operation, and one piece of partial target data PT14 representing the image D is newly generated (YES in S32 of FIG. 3), the print data generation unit 50 generates one piece of partial print data PP14 using one piece of partial target data PT14 (S34 of FIG. 3). The print data transmitting unit 52 transmits the one piece of partial print data PP14 to the printer 100 (S66 of FIG. 4).

If the printing start operation is carried out (YES in S36 of FIG. 3), the instruction transmitting unit 54 transmits the printing start instruction to the printer 100 (S38 in FIG. 3). The printer 100 executes printing using the partial print data PP11 to PP14 in the print data storage area 140 (S134 of FIG. 6).

(Case D)

The case D of FIG. 10 refers to a case where target data is already included in the target data file DF (see FIG. 1) of the file storage area 44, and target data is modified.

If the user operates the operating unit 14 to carry out the display operation of the target data file DF, the CPU 22 causes the display unit 12 to display a display image (YES in S12 of FIG. 2). The display image includes three images A to C of a size set in advance. As in the case C, three pieces of partial print data PP11 to PP13 are sequentially generated sequentially using three pieces of partial target data PT11 to PT13 representing the images A to C and transmitted to the printer 100. In the case D, the image A includes a character string "12345".

The user carries out an edition operation including an operation to erase the character "5" of the character string "12345" in the image A and an operation to input a character "6" behind the character string "1234" (YES in S42 of FIG. 3). In this case, the print data generation unit 50 generates partial print data PP11' representing "6". The print data generation unit 50 generates the modification information which includes the ID of partial print data PP11 and the modified place information representing a modified position in partial print data PP11 (S44 of FIG. 3). The print data transmitting unit 52 transmits partial print data PP11' of the modified place and the modification information to the printer 100.

Upon receiving the partial print data PP11' of the modified place and the modification information (YES in S104 of FIG. 5), the printer 100 specifies partial print data PP11 identified by the ID in the modification information (S106 of FIG. 5). The printer 100 generates partial print data (hereinafter, called "partial print data after substitution") where some data of partial print data PP11 is substituted with the partial print data PP11' of the modified place (S108 of FIG. 5). If the printing start instruction is received (YES in S120 of FIG. 5), the printer 100 executes printing using partial print data after substitution and partial print data PP12 and PP13 (S134 of FIG. 6).

According to this configuration, when the image A (that is, partial target data PT11 representing the image A) corresponding to partial print data PP11 is modified after the partial print data PP11 is generated and transmitted to the printer 100, it is possible to allow the printer 100 to execute printing using partial print data after substitution.

(Effects)

The PC 10 generates partial print data and transmits partial print data to the printer 100 before the printing start operation is carried out in the operating unit 14. If the printing start operation is carried out, the PC 10 transmits the printing start instruction to the printer 100. If the printing start instruction is received, the printer 100 executes printing of an image represented by partial print data in the print data storage area 140. According to this configuration, the printer 100 can rapidly start printing using partial print data compared to a configuration in which partial print data is transmitted to the printer after the printing start operation is carried out in the operating unit 14. Therefore, it is possible to rapidly provide the printing result to the user.

(Correspondence)

The PC 10 is one example of "terminal device." The printer driver 34 is one example of "computer program".

In the case A of FIG. 7, all of the eight images A to H are an example of "target image", and the eight images A to H are an example of "a plurality of first specific images". Partial print data PP11 to PP23 are one example of "a plurality of pieces of first print data". Partial print data PP11 is one example of "first print data" "when the printer is able to store first print data". Partial print data PP22 is one example of "first print data" "when the printer is unable to store first print data".

In the case B of FIG. 8, two images A and B are one example of "a plurality of first specific images which are generated when an operation according to a specific application program used by the terminal device is carried out in the operating unit".

In the case D of FIG. 10, two images B and C are an example of "a plurality of first specific images", one image A including the character string "12345" is one example of "second specific image", and partial print data PP11 is one example of "second print data". The character "6" of the character string "12346" is one example of "modified image", the character string "12346" is one example of "third specific image", partial print data PP11' of the modified place is one example of "third print data", and partial print data PP11 corrected by partial print data PP11' of the modified place is one example of "fourth print data".

The printing start operation is an example of "specific operation".

Although the exemplary embodiments of the invention have been described in detail, the above-described exemplary embodiments are just for illustration and not intended to limit the appended claims. The technique described in the appended claims includes various modifications and changes to the specific example described above.

Modifications to Exemplary Embodiments (1) In the above-described exemplary embodiments, as described in the case D of FIG. 10, when a portion of partial target data PT11 is modified by the edition operation of the user, the print data generation unit 50 generates partial print data PP11' representing the image of the modified place. Alternatively, the print data generation unit 50 may convert the whole of modified partial target data PT11 to generate partial print data PP11". In this case, the print data generation unit 50 may assign the same ID "fileX-11" as partial print data PP11 to partial print data PP11". The print data transmitting unit 52 may transmit partial print data PP11" and the ID.

In this modification, if partial print data PP11" and the ID are received, the printer 100 may erase partial print data PP11 identified by the received ID from the print data storage area 140, and may store received partial print data PP11" in the print data storage area 140.

In the configuration of this modification, partial print data PP11" includes partial print data PP11'. Accordingly, in this modification, partial print data PP11' included in partial print data PP11" is one example of "third print data", and partial print data PP11" is one example of "fourth print data".

(2) In the case D of FIG. 10, the print data generation unit 50 may convert modified partial target data PT11 to generate partial print data PP11", and may also convert partial target data PT12 and PT13 behind partial target data PT11 to generate partial print data PP12 and PP13. The print data transmitting unit 52 may transmit partial print data PP11" and partial print data PP12 and PP13. According to this configuration, when a subsequent image is modified by an edition operation of the partial target data PT11, the printer 100 may execute printing using partial print data corresponding to an image after modification.

(3) In the above-described example, in the print data generation process, when the display operation of the generation operation is carried out (S12 of FIG. 2), the PC 10 performs the process after S14 of FIG. 2. Alternatively or simultaneously, when an operation to download a data file to the PC 10 is carried out by the user and/or when an operation to designate a data file (for example, an operation to click a data file) is carried out by the user in the operating unit 14, the PC 10 may perform the process after S14 of FIG. 2. In general, in the first print data generation process, the computer may generate first print data before a specific operation is carried out after a designation operation to designate a target image has been carried out in the operating unit of the terminal device. In the first print data transmission process, the computer may transmit first print data to the printer before a specific operation is carried out after the designation operation has been carried out.

(4) Although in the above-described example, the respective units 50 to 56 are realized when the CPU 22 performs the processes in accordance with the printer driver 34, at least one of the units 50 to 56 may be realized by hardware, such as logic circuits. Similarly, although in the above-described example, the respective units 150 to 152 are realized when the CPU 122 performs the processes in accordance with the program 132, at least one of the units 150 to 152 may be realized by hardware, such as logic circuits.

(5) A program for realizing at least one function of the units 50 to 64 may be included in a specific program different from the printer driver 34. The memory 30 may store the specific program.

(6) The "terminal device" may not be a PC, and may be a terminal device, such as a mobile phone or a PDA, which is connected to a printer.

The technical components described in this specification or the drawings exert technical utility singly or by various combinations, and are not limited to combinations described in the appended claims at the time of the application. The technique described in this specification or the drawings can simultaneously achieve a plurality of purposes, and the achievement itself of one of the purposes has technical utility.

Incidentally, according to another illustrative aspect of the invention, in the first print data generation process, the computer program causes the computer to store the first print data in a memory of the terminal device. In the first print data transmission process, when the printer is able to store the first print data, the computer program causes the computer to transmit the first print data to the printer. The operations further comprise: an erasure process; and a maintenance process. The erasure process is for, when the first print data is transmitted to the printer, erasing the first print data from the memory. The maintenance process is for, when the printer is unable to store the first print data, maintaining the first print data in the memory without erasing the first print data from the memory until the first print data is transmitted to the printer.

According thereto, when the printer is unable to store the first print data (for example, the free space of the memory of the printer is small), the terminal device maintains the first print data in the memory of the terminal device until the first print data is transmitted to the printer. For this reason, the terminal device can appropriately transmit the first print data to the printer.

According to still another illustrative aspect of the invention, in the first print data transmission process, in a specific case where the first print data is maintained in the memory and the specific operation is carried out, the computer program causes the computer to transmit the first print data maintained in the memory to the printer.

According thereto, the terminal device can appropriately transmit the first print data to the printer.

According to still another illustrative aspect of the invention, in the first print data transmission process, in the specific case, after the printer ends printing on one printing medium, the computer program causes the computer to transmit the first print data maintained in the memory to the printer.

According thereto, the terminal device can transmit the first print data to the printer with the appropriate timing.

According to still another illustrative aspect of the invention, the target image includes a plurality of specific images. In first print data generation process, the computer program causes the computer to generate a plurality of pieces of first print data corresponding to the plurality of first specific images.

According to still another illustrative aspect of the invention, the plurality of first specific images are generated when an operation according to a specific application program to be used by the terminal device is carried out in the operating unit. In the first print data generation process, each time one first specific image is generated from among the plurality of first specific images in response to the operation according to the specific application program, the computer program causes the computer to generate one piece of first print data corresponding to the one first specific image. In the first print data transmission process, the computer program causes the computer to sequentially transmit the plurality of pieces of first print data to the printer.

According thereto, the terminal device can appropriately generate and transmit each of a plurality of pieces of first print data.

According to still another illustrative aspect of the invention, the target image further includes a second specific image which is a portion of the target image. The operations further comprise: a second print data generation process; a second print data transmission process; a third print data generation process; and a third print data transmission process. The second print data generation process is for generating second print data corresponding to the second specific image, wherein the second print data is generated before the specific operation is carried out. The second print data transmission process is for transmitting the second print data to the printer before the specific operation is carried out. The third print data generation process is for, when a modification operation to modify the second specific image to a third specific image where at least a portion of the second specific image is modified to a modified image is carried out in the operating unit after the second print data is transmitted to the printer, generating third print data corresponding to the modified image, the third print data being generated before the specific operation is carried out. The third print data transmission process is for transmitting the third print data to the printer before the specific operation is carried out. In the instruction transmission process, when the specific operation is carried out, the computer program causes the computer to transmit the printing start instruction to cause the computer to start printing using the first print data and fourth print data including the third print data and corresponding to the third specific image to the printer.

According thereto, when the second specific image corresponding to the second print data transmitted to the printer is modified to the third specific image, the printer can rapidly execute printing using the fourth print data corresponding to the third specific image.

What is claimed is:

1. A non-transitory computer-readable medium having a computer program stored thereon and readable by a computer mounted in a terminal device that is configured to be connected to a printer, the computer program, when executed by the computer, causes the computer to perform operations comprising:
   a first monitoring process for monitoring whether target data representing a target image enters a state in which the target data is editable by an application program;
   a first print data generation process for generating first print data corresponding to a first specific image which is at least a portion of the target image to be printed, wherein the first print data is generated before a specific operation to cause the printer to start printing using the first print data is carried out in an operating unit of the terminal device;
   a first print data transmission process for transmitting the first print data to the printer before the specific operation to cause the printer to start printing using the first print data is carried out;
   a second monitoring process for monitoring whether a predetermined part of the target data represented by the first specific image has been edited by the application program;
   a modification information transmission process for transmitting modification information, which represents a change between the target data before being edited and the edited target data, to the printer for the edited target data; and
   an instruction transmission process for, when the specific operation is carried out, transmitting a printing start instruction to cause the printer to start printing;
   wherein in the first print data generation process, the computer program causes the computer to store the first print data in a memory of the terminal device,
   wherein in the first print data transmission process, when the printer is able to store the first print data, the computer program causes the computer to transmit the first print data to the printer, and
   wherein the operations further comprise:
      an erasure process for, when the first print data is transmitted to the printer, erasing the first print data from the memory; and
      a maintenance process for, when the printer is unable to store the first print data, maintaining the first print data in the memory without erasing the first print data from the memory until the first print data is transmitted to the printer;
      wherein the modification information transmission process transmits the modification information to the printer when the printer is unable to store the first print data.

2. The non-transitory computer-readable medium according to claim 1,
   wherein, in the first print data transmission process, in a specific case where the first print data is maintained in the memory and the specific operation is carried out, the computer program causes the computer to transmit the first print data maintained in the memory to the printer.

3. The non-transitory computer-readable medium according to claim 2,
   wherein, in the first print data transmission process, in the specific case, after the printer ends printing on one printing medium, the computer program causes the computer to transmit the first print data maintained in the memory to the printer.

4. The non-transitory computer-readable medium according to claim 1,
   wherein the target image includes a plurality of specific images, and
   wherein in first print data generation process, the computer program causes the computer to generate a plurality of pieces of first print data corresponding to the plurality of first specific Images.

5. The non-transitory computer-readable medium according to claim 4,
   wherein the plurality of first specific images are generated when an operation according to a specific application program to be used by the terminal device is carried out in the operating unit,
   wherein in the first print data generation process, each time one first specific image is generated from among the plurality of first specific images in response to the operation according to the specific application program, the computer program causes the computer to generate one piece of first print data corresponding to the one first specific image, and
   wherein in the first print data transmission process, the computer program causes the computer to sequentially transmit the plurality of pieces of first print data to the printer.

6. The non-transitory computer-readable medium according to claim 4,
   wherein the operations further comprise:
      a determination process for determining whether the first print data corresponding to the predetermined part of the edited target data has been transmitted to the printer; and
      a modification process for, when it is determined that the first print data corresponding to the predetermined part of the target data has not been transmitted to the printer, modifying the target first print data as the modified first print data,
   wherein, when it is determined that the first print data corresponding to the predetermined part of the target data has been transmitted to the printer, the modification information transmission process transmits the modification information to the printer.

7. The non-transitory computer-readable medium according to claim 4,
   wherein the modification information is the modified first print data comprising a same positional information as the first print data corresponding to the predetermined part of the edited target data.

8. The non-transitory computer-readable medium according to claim 1,
wherein the modification information comprises a positional information representing a modified position of the first print data and the modified first print data.

9. The non-transitory computer-readable medium according to claim 1,
wherein the operations further comprise:
an end monitoring process for monitoring whether the application program ends; and
an erasure instruction transmission process for transmitting an erasure instruction to erase the first print data, which has been transmitted, when the application program ends.

10. A terminal device configured to be connected to a printer, the terminal device comprising:
an operating unit; and
a controller configured to:
monitor whether target data representing a target image enters a state in which the target data is editable by an application program;
generate first print data corresponding to a first specific image, which is at least a portion of the target image to be printed, wherein the first print data is generated before a specific operation to cause the printer to start printing using the first print data is carried out in the operating unit;
transmit the first print data to the printer before the specific operation to cause the printer to start printing using the first print data is carried out;
monitor whether a predetermined part of the target data represented by the first specific image has been edited by the application program;
transmit modification information, which represents a change between the target data before being edited and the edited target data, to the printer for the edited target data; and
transmit a printing start instruction to cause the printer to start printing when the specific operation is carried out;
wherein in the generate first print data process, the controller stores the first print data in a memory of the terminal device,
wherein in the transmit the first print data process, when the printer is able to store the first print data, the controller transmits the first print data to the printer, and
wherein the controller is further configured to:
erase the first print data from the memory when the first print data is transmitted to the printer; and
maintain the first print data in the memory without erasing the first print data from the memory until the first print data is transmitted to the printer when the printer is unable to store the first print data;
wherein in the transmit modification information process, the controller transmits the modification information to the printer when the printer is unable to store the first print data.

* * * * *